(12) United States Patent
Eldred et al.

(10) Patent No.: US 10,280,265 B2
(45) Date of Patent: May 7, 2019

(54) METHOD AND COMPOSITION FOR HYDROSILYLATION OF CARBOXYLIC ACID ALKENYL ESTERS AND HYDROGEN TERMINATED ORGANOSILOXANE OLIGOMERS WITH AN IRIDIUM COMPLEX CATALYST

(71) Applicant: Dow Silicones Corporation, Midland, MI (US)

(72) Inventors: Donald Eldred, Midland, MI (US); Matthew Jeletic, Freeland, MI (US); Ryan Christopher Thomas, Freeland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 15/755,628

(22) PCT Filed: Dec. 5, 2016

(86) PCT No.: PCT/US2016/064881
§ 371 (c)(1),
(2) Date: Feb. 27, 2018

(87) PCT Pub. No.: WO2017/100106
PCT Pub. Date: Jun. 15, 2017

(65) Prior Publication Data
US 2018/0244851 A1 Aug. 30, 2018

Related U.S. Application Data

(60) Provisional application No. 62/263,863, filed on Dec. 7, 2015.

(51) Int. Cl.
| | | |
|---|---|---|
| *C08G 77/20* | (2006.01) | |
| *C08G 77/12* | (2006.01) | |
| *C08G 77/38* | (2006.01) | |
| *C08L 83/04* | (2006.01) | |
| *C08K 5/101* | (2006.01) | |
| *C08K 5/56* | (2006.01) | |

(52) U.S. Cl.
CPC ............. *C08G 77/20* (2013.01); *C08G 77/12* (2013.01); *C08G 77/38* (2013.01); *C08K 5/101* (2013.01); *C08K 5/56* (2013.01); *C08L 83/04* (2013.01)

(58) Field of Classification Search
CPC .................................. C08G 77/12; B01J 23/468
See application file for complete search history.

(56) References Cited

U.S. PATENT DOCUMENTS

| | | |
|---|---|---|
| 4,504,629 A | 3/1985 | Lien et al. |
| 5,750,753 A | 5/1998 | Kimae et al. |
| 5,840,813 A | 11/1998 | Gornowicz et al. |
| 6,388,119 B1 | 5/2002 | Bauer et al. |
| 7,208,618 B2 | 4/2007 | Kornek et al. |
| 7,659,418 B2 | 2/2010 | Ramdani et al. |
| 7,884,225 B2 | 2/2011 | Guennouni et al. |
| 9,587,063 B2 | 3/2017 | Cakmak et al. |
| 2008/0033136 A1 | 2/2008 | Rinard et al. |
| 2010/0150984 A1* | 6/2010 | Kennedy ............ A61F 2/022 424/424 |
| 2014/0203323 A1 | 7/2014 | Ozai |
| 2014/0206869 A1 | 7/2014 | Brandstadt et al. |

FOREIGN PATENT DOCUMENTS

| | | |
|---|---|---|
| JP | 2003096086 | 4/2003 |
| JP | 2005131454 | 5/2005 |
| JP | 2011063568 | 3/2011 |

OTHER PUBLICATIONS

Igarashi, et. al., "Ir-catalyzed hydrosilylation reaction of allyl acetate with octakis(dimethylsiloxy octasilsesquioxane and related hydrosilanes" Journal of Organometallic Chemistry, 2014, vol. 752, pp. 141-146.
Nakajima, et. al., "Iridium-Catalyzed Chemoselective Reductive Nucleophilic Addition to N-Methoxyamides", Organic Letters, 2015, American Chemical Socity, pp. 1696-1699.
Riener, et. al. "Mechanistic insights into the iridium-catalyzed hydrosilylation of allyl compounds", Journal of Catalysis, 2015, vol. 331, pp. 203-209.

\* cited by examiner

*Primary Examiner* — Kuo Liang Peng
(74) *Attorney, Agent, or Firm* — Catherine U. Brown

(57) ABSTRACT

A method can selectively prepare a compound of formula (IV), where each $R^1$ and each $R^2$ are independently selected from an alkyl group, an aryl group, a halogenated alkyl group, or a halogenated aryl group of 6 to 10 carbon atoms each $R^3$ is an alkane-diyl group, and each $R^4$ is hydrogen or an alkyl group. The method involves hydrosilylation of an organohydrogensiloxane oligomer with a carboxylic acid alkenyl ester using an iridium complex catalyst.

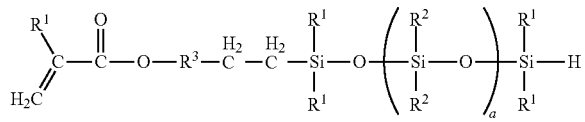

15 Claims, No Drawings

METHOD AND COMPOSITION FOR HYDROSILYLATION OF CARBOXYLIC ACID ALKENYL ESTERS AND HYDROGEN TERMINATED ORGANOSILOXANE OLIGOMERS WITH AN IRIDIUM COMPLEX CATALYST

This application is a U.S. national stage filing under 35 U.S.C. § 371 of PCT Application No. PCT/US2016/64881 filed on 5 Dec. 2016, which claims the benefit of U.S. Provisional Patent Application No. 62/263,863 filed 7 Dec. 2015 under 35 U.S.C. § 119 (e). PCT Application No. PCT/US2016/64881 and U.S. Provisional Patent Application No. 62/263,863 are hereby incorporated by reference.

The target product in the reaction scheme shown below may be prepared by hydrosilylation reaction of allyl methacrylate with tetramethyldisiloxane using a platinum catalyst.

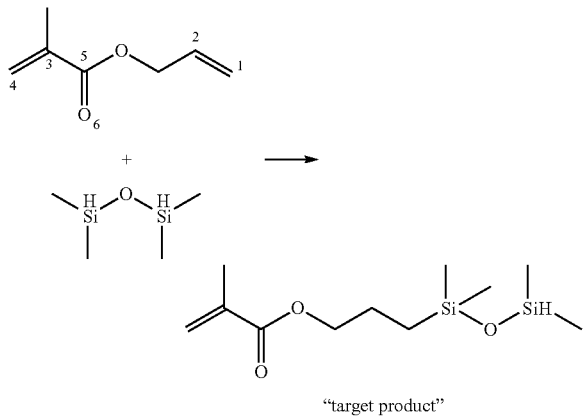

"target product"

However, this method suffers from the drawback that hydrosilylation reaction can occur at multiple sites (such as those labelled 1 through 6 in the reaction scheme) of the allyl methacrylate, therefore the target product is produced in a reaction mixture with various side products that may be costly to remove. By hydrosilylation at a site labelled 1 through 6, it is meant hydrosilylation of a C=C or C=O bond where the number of the site refers to where the silicon atom attaches. In addition, without prompt removal or deactivation of the Pt catalyst, "over hydrosilylation" of the target product will occur, leading to a side product in which both hydrogen atoms on the hydrogen terminated organosiloxane oligomer have reacted with an allyl methacrylate molecule and/or a gel forms. Therefore, there is an industry need to produce the target product shown above with high selectivity and high yield. And, there is a need to produce the target product stable in the presence of catalyst.

BRIEF SUMMARY OF THE INVENTION

A method for selectively preparing a product comprises:
1) combining ingredients comprising
(A) an organohydrogensiloxane oligomer of formula (I)

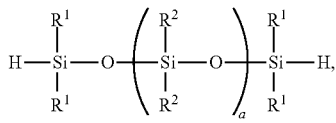

where each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms, each $R^2$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms, and subscript a is an integer up to 20;
(B) a carboxylic acid alkenyl ester of formula (II)

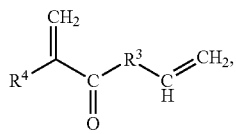

where $R^3$ is an alkylene group of 1 to 6 carbon atoms, and $R^4$ is hydrogen or an alkyl group of 1 to 6 carbon atoms; and
(C) an iridium complex of formula (III)

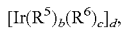

where subscript b is 1 or 2, $R^5$ is a 1,5-cyclooctadiene ligand or a 2,5-norbornadiene ligand, subscript c is 0, 1 or 2, $R^6$ is a ligand that can be activated off the complex at a temperature less than a boiling point of the organohydrogensiloxane oligomer, and subscript d is 1 or 2.

The product comprises a compound of formula (IV):

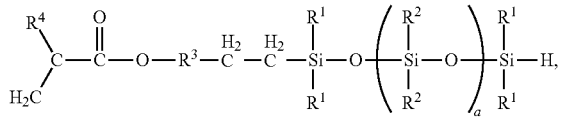

where $R^1$, $R^2$, $R^3$, $R^4$ and subscript a are as described above.

A composition is prepared by mixing ingredients comprising:
(A) an organohydrogensiloxane oligomer of formula (I)

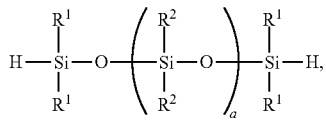

where each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms, each $R^2$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms, and subscript a is an integer up to 20;
(B) a carboxylic acid alkenyl ester of formula (II)

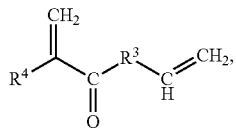

where $R^3$ is an alkylene group of 1 to 6 carbon atoms, and $R^4$ is hydrogen or an alkyl group of 1 to 6 carbon atoms; and (C) an iridium complex of formula (III)

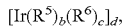

where subscript b is 1 or 2, $R^5$ is a 1,5-cyclooctadiene ligand or a 2,5-norbornadiene ligand, subscript c is 0, 1 or 2, $R^6$ is a ligand that can be activated off the complex at a temperature less than a boiling point of the organohydrogensiloxane oligomer, and subscript d is 1 or 2.

The compound of formula (IV) prepared from the method and composition above is useful for functionalization of organosiloxane polymers.

In an alternative embodiment, a method for selectively preparing a product comprises:
1) combining ingredients comprising
(A) an organohydrogensiloxane oligomer of unit formula (VI)

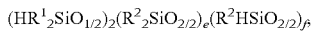

where subscript e is 0 to 20, subscript f is 0 to 20, each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; each $R^2$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms;

(B) a carboxylic acid alkenyl ester of formula (II)

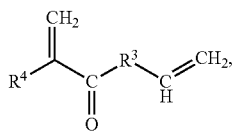

where $R^3$ is an alkylene group of 1 to 10 carbon atoms, and $R^4$ is hydrogen or an alkyl group of 1 to 6 carbon atoms; and
(C) an iridium complex of formula (III)

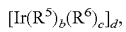

where subscript b is 1 or 2, $R^5$ is a 1,5-cyclooctadiene ligand or a 2,5-norbornadiene ligand, subscript c is 1 or 2, $R^6$ is a ligand that can be activated off the complex at a temperature less than the boiling point of the organohydrogensiloxane oligomer, and subscript d is 1 or 2. The product comprises a compound of unit formula (VII)

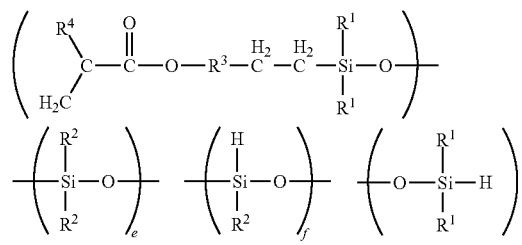

with at least 80 mole % selectivity based on all compounds formed by hydrosilylation of ingredients (A) and (B).

A method for preparing an acrylate functional organosiloxane polymer comprises:

1) combining ingredients comprising
(A) an organohydrogensiloxane oligomer of unit formula (V):

where subscript e is 0 to 20, subscript f is 0 to 20, each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; each $R^2$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms;

(B) a carboxylic acid allyl ester of formula (II)

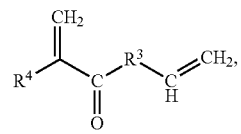

where $R^3$ is an alkylene group of 1 to 10 carbon atoms, and $R^4$ is hydrogen or an alkyl group of 1 to 6 carbon atoms; and
(C) an iridium complex of formula (III)

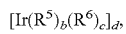

where subscript b is 1 or 2, $R^5$ is a 1,5-cyclooctadiene ligand or a 2,5-norbornadiene ligand, subscript c is 1 or 2, $R^6$ is a ligand that can be activated off the complex at a temperature less than the boiling point of the organohydrogensiloxane oligomer, and subscript d is 1 or 2;
where the product comprises a compound of unit formula (VII)

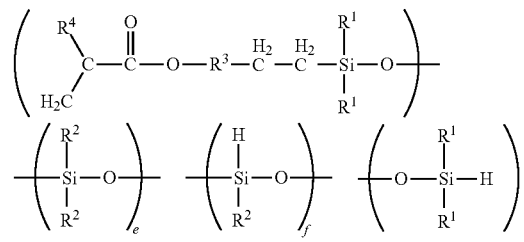

with at least 80 mole % selectivity; and
2) combining (a) the compound of formula (VII) with (b) an aliphatically unsaturated organosiloxane polymer and optionally (c) a hydrosilylation catalyst other than the iridium cyclooctadiene complex of formula (III).

A composition prepared by mixing ingredients comprises:
(A) an organohydrogensiloxane oligomer of unit formula (V):

where subscript e is 0 to 20, subscript f is 0 to 20, each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; each $R^2$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms;

(B) a carboxylic acid alkenyl ester of formula (II)

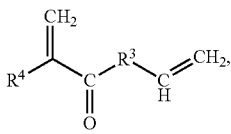

where $R^3$ is an alkylene group of 1 to 10 carbon atoms, and $R^4$ is hydrogen or an alkyl group of 1 to 6 carbon atoms; and
(C) an iridium complex of formula (III)

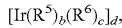

where subscript b is 1 or 2, $R^5$ is a 1,5-cyclooctadiene ligand or a 2,5-norbornadiene ligand, subscript c is 1 or 2, $R^6$ is a ligand that can be activated off the complex at a temperature less than the boiling point of the organohydrogensiloxane oligomer, and subscript d is 1 or 2.

DETAILED DESCRIPTION OF THE INVENTION

Ingredient (A) useful in the method and composition described herein is an organohydrogensiloxane oligomer. Ingredient (A) may be an organohydrogensiloxane oligomer of unit formula (V): $(HR^1{}_2SiO_{1/2})_2(R^2{}_2SiO_{2/2})_e(R^2HSiO_{2/2})_f$, where subscript e is an integer from 0 to 20; subscript f is an integer from 0 to 20; each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; and each $R^2$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms. Examples of suitable organohydrogensiloxane oligomers for ingredient (A) include 1,1,3,5,5-pentamethyltrisiloxane, 1,1,2,2,3,3-hexamethyltrisiloxane, tetramethyldisiloxane, 1,1,2,2,3,3-hexaethyltrisiloxane, and tetraethyldisiloxane. Alternatively, subscript e may be 0 to 10; alternatively subscript e may be 0 to 5; and alternatively subscript e is 0 or 1. Alternatively, subscript e may be 2 to 10; alternatively subscript e may be 2 to 5. Alternatively, subscript f may be 0 to 10; alternatively subscript f may be 0 to 5; and alternatively subscript f is 0 or 1. Alternatively, subscript f may be 2 to 10; alternatively subscript f may be 2 to 5. Alternatively, subscript e=0 and subscript f=1. Alternatively, subscript e=0 and subscript f=0. Alternatively, $R^1$ and $R^2$ may be as defined below.

In an alternative embodiment, ingredient (A) has formula (I):

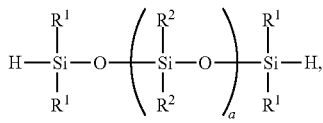

where each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; each $R^2$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; and subscript a is an integer up to 20.

Alternatively, subscript a is 0 to 10; alternatively subscript a is 0 to 5; and alternatively subscript a is 0 or 1. Alternatively, subscript a may be 2 to 10; alternatively subscript a is 2 to 5. Suitable alkyl groups for $R^1$ and $R^2$ are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, as well as branched saturated hydrocarbon groups of 6 carbon atoms. Suitable aryl groups for $R^1$ and $R^2$ are exemplified by, but not limited to, phenyl, tolyl, xylyl, naphthyl, benzyl, and dimethyl phenyl. Suitable halogenated alkyl groups for $R^1$ and $R^2$ are exemplified by, but not limited to, the alkyl groups described above where one or more hydrogen atoms is replaced with a halogen atom, such as F or Cl. For example, fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl are examples of suitable halogenated alkyl groups. Suitable halogenated aryl groups for $R^1$ and $R^2$ are exemplified by, but not limited to, the aryl groups described above where one or more hydrogen atoms is replaced with a halogen atom, such as F or Cl. For example, chlorobenzyl and fluorobenzyl are suitable halogenated aryl groups. Alternatively, each $R^1$ is independently methyl, ethyl or propyl. Each instance of $R^1$ and $R^2$ may be the same or different. Alternatively, each $R^1$ and each $R^2$ are methyl groups. Examples of suitable hydrogen terminated organosiloxane oligomers include 1,1,2,2,3,3-hexamethyltrisiloxane, tetramethyldisiloxane, 1,1,2,2,3,3-hexaethyltrisiloxane, and tetraethyldisiloxane. Alternatively, ingredient (A) may be tetramethyldisiloxane.

Ingredient (B) useful in the method and composition described herein is a carboxylic acid alkenyl ester. Ingredient (B) has of formula (II):

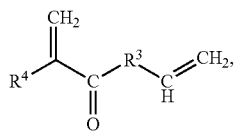

where $R^3$ is an alkane-diyl group of 1 to 6 carbon atoms, and $R^4$ is hydrogen or an alkyl group of 1 to 6 carbon atoms. Alternatively, $R^3$ may be methane-diyl, ethane-1,2-diyl, or hexane-1,6-diyl; and alternatively $R^3$ may be methane-diyl. Alternatively, R3 may be an alkylene group of 1 to 10 carbon atoms; alternatively 1 to 6 carbon atoms, and alternatively 1 to 3 carbon atoms. Suitable alkyl groups for $R^4$ are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, as well as branched saturated hydrocarbon groups of 6 carbon atoms. Alternatively, $R^4$ may be methyl, ethyl or propyl. Alternatively, $R^4$ is a methyl group. Examples of carboxylic acid alkenyl esters include allyl methacrylate.

Ingredient (A) and ingredient (B) are present in relative molar amounts of ingredient (A):ingredient (B) greater than or equal to 1, i.e., (A):(B) ratio≥1:1. Alternatively, (A):(B) ratio may range from 5:1 to 1:1, alternatively 2:1 to 1:1; and alternatively 1.5:1 to 1:1. Without wishing to be bound by theory, it is thought that a molar excess of ingredient (A) relative to ingredient (B) may favorably affect selectivity in the product.

Ingredient (C) useful in the method and composition described herein is an iridium complex. The iridium complex has formula (III): $[Ir(R^5)_b(R^6)_c]_d$, where subscript b is 1 or 2, $R^5$ is a 1,5-cyclooctadiene ligand or a 2,5-norbornadiene ligand, subscript c is 0 to 2, alternatively 0 or 1, $R^6$ is a ligand that can be activated, and subscript d is 1 or 2. Activating with respect to $R^6$ may be performed by any convenient means, such as heating at a temperature less than the boiling point of the organohydrogensiloxane oligomer, adding a silver salt, or by photochemical or electrochemical means in step (1) of the method described herein. Examples of ligands suitable for $R^6$ include a halogen atom, a beta-ketoester ligand, a halogenated beta-ketoester ligand, an alkoxy ligand, a cyanoalkyl ligand, an aryl ligand, and a heteroaryl ligand. Examples of suitable halogen atoms include bromine (Br), chlorine (Cl) and iodine (I). Alternatively, the halogen atom may be Cl. Examples of beta-ketoester ligands include acetyl acetonate (acac). Examples of halogenated beta-ketoesters include hexafluoro acetylacetonate (hfacac). Examples of alkoxy ligands include methoxy, ethoxy, and propoxy. Alternatively the alkoxy ligand may be methoxy. Examples of suitable cyanoalkyl ligands include $CH_3CN$, acetonitrile, and tetrahydrofuran (THF). Examples of suitable aryl ligands include phenyl, benzyl, or indenyl. Examples of suitable heteroaryl ligands include pyridine.

The amount of ingredient (C) used in step (1) of the method described above depends on various factors including the specific organohydrogensiloxane oligomer selected for ingredient (A), the specific carboxylic acid alkenyl ester selected for ingredient (B), and the temperature to which the mixture can be heated without boiling away the organohydrogensiloxane oligomer selected for ingredient (A). However, the amount of ingredient (C) may be sufficient to provide a molar amount of iridium metal in the mixture of 1 parts per million (ppm) to 100 ppm, alternatively 5 ppm to 80 ppm, alternatively 5 ppm to 20 ppm based on combined weights of ingredients (A) and (B). Without wishing to be bound by theory, it is thought that at catalyst loading toward the upper end of the range, yield may decrease due to gels forming as side products, but selectivity toward the compound of formula (IV) remains favorable. The method may optionally further comprise deactivation or removal of the catalyst. However, with appropriate catalyst loading, the step of deactivation or removal of the catalyst may be omitted.

Without wishing to be bound by theory, it is thought that a catalyst loading toward or above the upper end of the range can result in a decrease in selectivity due to hydrosilylation at sites 3, 4, 5, or 6 shown in the reaction scheme above. However, the inventors surprisingly found that hydrosilylation is minimized at site 2 using the method of this invention, even with high catalyst loading. In contrast, hydrosilylation of allyl methacrylate and hexamethyldisiloxane using a platinum catalyst instead of the catalyst described herein resulted in substantially more hydrosilylation at site 2 than the method described herein using the iridium complex of ingredient (C). The side product made by hydrosilylation at site 2 is costly to remove, therefore, the selectivity of the catalyst described herein to hydrosilylate at site 1 and not at site 2 is beneficial to producing the compound of formula (IV) with high yield and selectivity, and fewer side products that are less costly to remove than side products of a process using a platinum catalyst instead of the catalyst described herein.

The method described herein selectively produces a product. The product comprises unit formula (VII):
a compound of unit formula (VII)

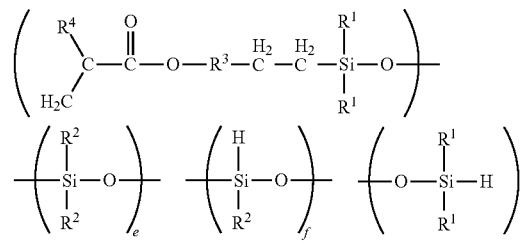

where $R^1$, $R^2$, $R^3$, and $R^4$, and subscripts e and f are as described above. Alternatively, in unit formula (VIII), subscript e may be 0 to 10 and subscript f may be greater than 0 to 10. Alternatively, in unit formula (VIII), when subscript e=0 and subscript f=1, the acrylate functional organosiloxane polymer has formula (IX):

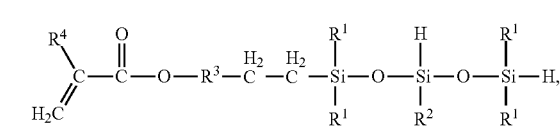

where each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; each $R^2$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; $R^3$ is an alkane-diyl group of 1 to 10 carbon atoms, and $R^4$ is hydrogen or an alkyl group of 1 to 6 carbon atoms. In an alternative embodiment, the acrylate functional organosiloxane polymer of formula (IX) may have each $R^1$ is a methyl group, each $R^2$ is a methyl group, $R^3$ is methane-diyl, and $R^4$ is a methyl group.

In an alternative embodiment, e.g., when the compound of formula (I) is used as ingredient (A), the product comprises a compound of formula (IV):

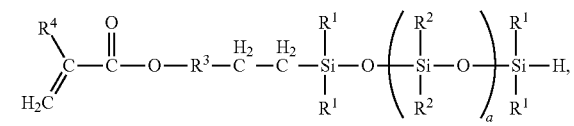

where $R^1$, $R^2$, $R^3$, $R^4$ and subscript a are as described above. The product of the method comprises compounds produced by hydrosilylation of ingredients (A) and (B), and the compound of unit formula (VII) in the product may be at least 80 mole % of the compounds produced by hydrosilylation of ingredients (A) and (B). Alternatively, the compound of formula (IV) in the product may be at least 80 mole % of the compounds produced by hydrosilylation of ingredient (A), formula (I), and ingredient (B). (For example, when tetramethyldisiloxane is used as ingredient (A) and allyl methacrylate is used as ingredient (B) are used in the method described herein the hydrosilylation results in compounds produced in the product, and at least 80 mole % of the compounds produced will be the target product shown in the reaction scheme in the examples, based on all compounds produced by hydrosilylation in the product. The side products, which are compounds formed when hydrosilylation occurs at sites 2, 3, 4, 5, or 6 or when gels are formed, will comprise the remaining up to 20 mole % of the products formed by hydrosilylation). Alternatively, selectivity may be 80 mole % to 100 mole %; alternatively 89 mole % to 99 mole %; and alternatively 95 mole % to 99 mole %; and alternatively 97 mole % to 99 mole % of the compound of formula (IV).

The method described herein may be performed at 1 atmosphere of pressure or higher. Alternatively, the method may be performed at 1 atmosphere to 1.5 atmosphere. Step (1) may be performed at room temperature of 25° C., or with heating. The temperature for heating in step (1) depends on various factors including the pressure selected, however, heating may be performed at least 50° C. to ensure the reaction proceeds quickly enough to be practical. The upper limit for temperature during heating is not critical and depends on the ingredients selected, i.e., the upper limit should be such that the ingredients do not vaporize out of the reactor selected for performing the method. Alternatively, heating may be from 50° C. to 100° C., alternatively 50° C. to 70° C.

The ingredients in step (1) of the method described above form a mixture, which may be homogeneous or heterogeneous. One or more additional ingredients, i.e., in addition to ingredients (A), (B), and (C) described above, may optionally be used in the method and composition described herein. The additional ingredient, when present, may be (D) a solvent or (E) a stabilizer, or both (D) and (E).

Ingredient (D) is a solvent that may be added to the mixture used in step (1) of the method described herein. One or more of ingredients (A), (B), and/or (C) may be provided in a solvent. For example, the ingredient (C) may be dissolved in a solvent that is added to the mixture in step (1). The solvent may facilitate contacting of reactants and catalyst, flow of the mixture and/or introduction of certain ingredients, such as the catalyst. Solvents used herein are those that help fluidize the ingredients of the mixture but essentially do not react with any of these ingredients. Solvents may be selected based on solubility the ingredients in the mixture and volatility. The solubility refers to the solvent being sufficient to dissolve ingredients of the mixture. Volatility refers to vapor pressure of the solvent. If the solvent is too volatile (having too high vapor pressure) the solvent may not remain in solution during heating. However, if the solvent is not volatile enough (too low vapor pressure) the solvent may be difficult to remove from the product or isolate from the compound of formula (IV).

The solvent may be an organic solvent. The organic solvent can be an aromatic hydrocarbon such as benzene, toluene, or xylene, or a combination thereof. Ingredient (D) may be one solvent. Alternatively, ingredient (D) may comprise two or more different solvents.

The amount of solvent can depend on various factors including the specific solvent selected and the amount and type of other ingredients selected for the mixture. However, the amount of solvent may range from 0% to 99%, or when present, 1% to 99%, and alternatively 2% to 50%, based on the weight of the mixture.

Ingredient (E) is a stabilizer. The stabilizer may be added to stabilize the compound of formula (IV). Suitable stabilizer include an antioxidant, a UV absorber, a UV stabilizer, a heat stabilizer, or a combination thereof. Suitable antioxidants are known in the art and are commercially available. Suitable antioxidants include phenolic antioxidants and combinations of phenolic antioxidants with stabilizers. Phenolic antioxidants include fully sterically hindered phenols and partially hindered phenols. Alternatively, the stabilizer may be a sterically hindered amine such as tetramethylpiperidine derivatives. Suitable phenolic antioxidants include dibutylhydroxytoluene (BHT), vitamin E and IRGANOX® 1010 from Ciba Specialty Chemicals, U.S.A. IRGANOX® 1010 comprises pentaerythritol tetrakis(3-(3, 5-di-t-butyl-4-hydroxyphenyl)propionate). Examples of UV absorbers include phenol, 2-(2H-benzotriazol-2-yl)-6-dodecyl-4-methyl-, branched and linear (TINUVIN® 571). Examples of UV stabilizers include bis(1,2,2,6,6-pentamethyl-4-piperidyl) sebacate; methyl 1,2,2,6,6-pentamethyl-4-piperidyl/sebacate; and a combination thereof (TINUVIN® 272). These and other TINUVIN® additives, such as TINUVIN® 765 are commercially available from Ciba Specialty Chemicals of Tarrytown, N.Y., U.S.A. Other UV and light stabilizers are commercially available, and are exemplified by LowLite from Chemtura, OnCap from PolyOne, and Light Stabilizer 210 from E. I. du Pont de Nemours and Company of Delaware, U.S.A. Oligomeric (higher molecular weight) stabilizers may alternatively be used, for example, to minimize potential for migration of the stabilizer out of the composition or the cured product thereof. An example of an oligomeric antioxidant stabilizer (specifically, hindered amine light stabilizer (HALS)) is Ciba TINUVIN® 622, which is a dimethylester of butanedioic acid copolymerized with 4-hydroxy-2,2,6,6-tetramethyl-1-piperidine ethanol. Heat stabilizers may include iron oxides and carbon blacks, iron carboxylate salts, cerium hydrate, barium zirconate, cerium and zirconium octoates, and porphyrins.

The amount of ingredient (E) depends on various factors including the specific stabilizer selected, the amount of catalyst, and the types and amounts of ingredients (A) and (B). Ingredient (E) may be one stabilizer. Alternatively, ingredient (E) may comprise two or more different stabilizers. Ingredient (E) may be added in an amount sufficient to provide 50 parts per million (ppm) to 10,000 ppm, alternatively 50 ppm to 200 ppm, alternatively 50 ppm to 100 ppm based on the weight of the compound of formula (IV) in the product.

Ingredient (E), the stabilizer, may be added before, during, or after step (1). Alternatively, ingredient (E) may be added during or after recovering the compound of formula (IV) from the product.

The method may optionally further comprise one or more additional steps. The method may further comprise step (2), recovering the compound of formula (IV) from the product after step (1) described above. Step (2) may be performed by any convenient means, such as stripping or distillation, with heating or under vacuum, or a combination thereof.

The compound of general formula (IV) described above is useful for functionalization of organosiloxane polymers, including oligomers and longer chain polymers, containing unsaturated functionality. For example, a hydrosilylation reaction of the SiH group in the compound of formula (IV) with an aliphatically unsaturated group in an organosiloxane polymer (such as a polydiorganosiloxane having aliphatically unsaturated terminal groups) can produce an acrylate functional organosiloxane polymer. The polydiorganosiloxane having aliphatically unsaturated terminal groups may have formula (V): $R^7_2R^8SiO(R^7_2SiO)_bSiR^7_2R^8$, In formula (V), each $R^7$ is independently a hydrogen atom, an alkyl group, an aryl group, a halogenated alkyl group, or a halogenated aryl group (such as those described above for $R^1$ and $R^2$, and each $R^8$ is independently an aliphatically unsaturated organic group such as an alkenyl group exemplified by alkenyl groups such as vinyl, allyl, butenyl, and hexenyl; and alkynyl groups such as ethynyl and propynyl. Subscript b may be 0 or a positive number. Alternatively, subscript b has an average value of at least 2. Alternatively subscript b may have a value ranging from 2 to 2000.

The compound of formula (V) may comprise a polydiorganosiloxane such as
i) dimethylvinylsiloxy-terminated polydimethylsiloxane,
ii) dimethylvinylsiloxy-terminated poly(dimethylsiloxane/methylphenylsiloxane),
iii) dimethylvinylsiloxy-terminated poly(dimethylsiloxane/diphenylsiloxane),
iv) phenyl,methyl,vinyl-siloxy-terminated polydimethylsiloxane, or
v) dimethylhexenylsiloxy-terminated polydimethylsiloxane.
The acrylate functional organosiloxane polymers, such as acrylate functional polydimethylsiloxanes, prepared by functionalizing the polyorganosiloxane polymers with aliphatically unsaturated terminal groups can be used in any application that utilizes reactivity of the acrylate group.

EXAMPLES

These examples are intended to illustrate some embodiments of the invention and should not be interpreted as limiting the scope of the invention set forth in the claims. In the examples below TMDS refers to tetramethyldisiloxane, AMA refers to allyl methacrylate, BHT refers to butylatedhydroxytoluene and Karstedt's catalyst refers to an organoplatinum compound complexed with a divinyl containing dimethylsiloxane. All ingredients are commercially available from Sigma Aldrich or Strem.

The carboxylic acid alkenyl esters described above as ingredient (A) have six different sites at which silicon attachment through hydrosilylation reaction can occur. An example of ingredient (A), allyl methacrylate, is shown below with the different sites labelled 1, 2, 3, 4, 5, and 6. Organohydrogensiloxane oligomers described above as ingredient (B) have two sites at which hydrosilylation reaction can occur. An example of ingredient (B), tetramethyldisiloxane, is shown below. An example reaction in which tetramethyldisiloxane is used as ingredient (A) and allyl methacrylate is used as ingredient (B) to prepare a target product of formula (IV), where hydrosilylation reaction occurs selectively at site 1 is shown below. The inventors surprisingly found that using an iridium 1,5-cyclooctadiene ligand complex as catalyst for hydrosilylation of the hydrogen terminated organosiloxane oligomer and the carboxylic acid ester selectively catalyzed hydrosilylation reaction at site 1, instead of catalyzing silicon attachment through hydrosilylation at all six possible sites. Examples 2 and 3 below illustrate how the method described herein can selectively catalyze hydrosilylation at site 1, thereby producing the target product with high selectivity and yield.

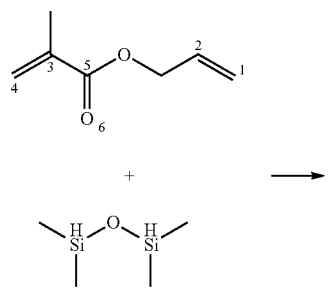

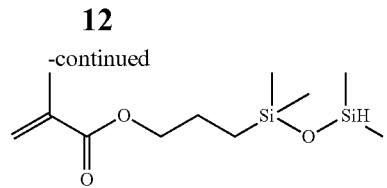

"target product"

Example 1—Karstedt's Catalyst (Comparative)

The following ingredients were combined in a flask: 60 g of tetramethyldisiloxane (TMDS), 0.1 g butylatedhydroxytoluene (BHT), 0.6 g of methyl ethyl triacetoxysilane, and 21 μL of a 0.046 M (~2%) solution of Karstedt's catalyst in toluene. The contents of the flask were heated to 55° C. under nitrogen, and then 19.2 g allyl methacrylate (AMA) was slowly added in over a 10 minute period. The resulting exotherm was controlled by using flowing air around the outside of the flask and removing the heat source. The temperature was maintained from 55° C. to 58° C. for a 2 hour period. After the 2 hours, conversion of AMA was determined by GC-MS and $^1$H NMR, with both indicating 3 mole % to 5 mole % AMA left over several trials.

The product prepared as above was then processed by first removing the excess TMDS by vacuum at room temperature, followed by sending the resulting crude product through a silica gel column (200-400 mesh, 9 inch length×1 inch diameter) and eluting with 9:1 hexane:ethyl acetate. Upon removing the hexane and ethyl acetate solvent, the product was distilled to provide it in ~50% yield and ~95% purity.

This attempt to synthesize the target product by hydrosilylation of allyl methyl acrylate and 3 molar equivalents of tetramethyldisiloxane with Karstedt's catalyst resulted in the product of the method including the target product and many other side products due to hydrosilylation occurring at all sites. Yield of Example 1 was as follows: 50% of AMA reacted formed the target product, the remaining 50% reacted to form side products. Of the side products, 10% of AMA converted hydrosilylated at site 2 (to form a branched side product), 25% of AMA converted to a double capped side product, where both SiH on one siloxane molecule reacted with an AMA molecule, and 15% of AMA reacted to other side products. Without immediate processing to remove Karstedt's catalyst, over-hydrosilylation of the target product occurred, e.g., after the target product formed, further hydrosilylation of the acrylate group on the allyl methacrylate led to a side product. This issue has largely been attributed to failure to remove Karstedt's catalyst.

Example 2—Screening Catalyst Candidates

In this example 2, different iridium catalyst candidates were tested. For each experiment, 2 g TMDS and 32 μL of 0.025 M of the catalyst candidate (in toluene) were combined and heated to the temperature shown in Table 1, below. AMA was added over the time period at the temperature shown in Table 1.

Selectivity to the target product was analyzed as in example 1, and is expressed in Table 1 as the molar amount of target product:molar amount of side products. AMA conversion refers to the mole % of AMA consumed after the reaction was complete. TOF(h−1) refers to rate at which the target product formed, and TON refers to lifetime that the target product remains after its formation (i.e., without further reacting the second silicon bonded hydrogen atom from the oligomer with a second AMA molecule).

contents of the flask were heated at 55° C. under nitrogen and then 130 μL of a 0.025 M solution of $[Ir(COD)Cl]_2$ was added. The temperature was kept between 55 and 57° C.

TABLE 1

Conditions and Results of Examples 1 and 2

| Candidate | time (h) | temp | Selectivity | AMA Conversion | TOF (h−1) | TON | AMA Scale |
|---|---|---|---|---|---|---|---|
| Karstedt's Catalyst (control) | 2 | 60 | 67:33 | 100% | 50k | 100k | 34 g |
| Ir(I)CODCl-dimer | 16 | 50 | 89:11 | 100% | 625 | 10k | 1 g |
| trans-$(PPh_3)_2Ir(CO)Cl$ (comparative) | 1 | 50 | N/A | 0 | 0 | 0 | 1 g |
| trans-$(PPh_3)_2Ir(CO)Cl$ (comparative) | 1 | 70 | N/A | 0 | 0 | 0 | 1 g |
| Ir(I)CODCl-dimer | 0.5 | 50 | 99:1 | 100% | 20k | 10k | 1 g |
| Ir(I)CODCl-dimer | 1 | 50 | 97:3 | 100% | 10k | 10k | 5 g |
| Ir(I)CODCl-dimer | 1 | 50 | 98:2 | 100% | 30k | 30k | 5 g |
| Ir(I)CODCl-dimer | 2.5 | 50 | 99:1 | 100% | 25k | 50k | 5 g |
| Ir(I)CODacac | 2 | 50 | N/A | 0% | 0 | 10k | 1 g |
| Ir(I)CODacac | 1 | 70 | 97:3 | 100% | 10k | 10k | 1 g |
| Ir(I)$COD_2$BARF | 2 | 50 | N/A | 0% | 0 | 10k | 1 g |
| Ir(I)$COD_2$BARF | 1 | 70 | N/A | 0% | 0 | 10k | 1 g |
| Ir(I)COD(OMe)-dimer | 1 | 50 | 99:1 | 100% | 10k | 10k | 1 g |
| Ir(I)$COE_2$Cl-dimer (comparative) | 1 | 50 | >95% | very little | <50 | 10k | 1 g |
| Ir(I)$COE_2$Cl-dimer* (comparative) | 1 | 50 | >95% | very little | ~10k | ~10k | 1 g |
| Ir(I)COD(hfacac) | 1 | 50 | 99:1 | 50% | 5k | 5k | 1 g |
| Ir(I)COD$(CH_3CN)_2$ | 1 | 50 | 80:20 | 100% | 10k | 10k | 1 g |
| Ir(I)acac$(CO)_2$ (comparative) | 1 | 50 | N/A | 0 | 0 | 0 | 1 g |
| Ir(I)acac$(CO)_2$ (comparative) | 1 | 70 | N/A | 0 | 0 | 0 | 1 g |
| Ir(I)COD$(pyridine)_2$ | 1 | 50 | 99:1 | 38% | 3800 | 3800 | 1 g |
| Ir(I)COD(indenyl) | 1 | 50 | N/A | 0 | 0 | 0 | 1 g |
| Ir(I)COD(indenyl) | 1 | 70 | 99:1 | 36% | 3600 | 3600 | 1 g |

In Table 1, COD represents a 1,5 cyclooctadiene ligand. COE represents a cis-cyclooctene ligand. BARF represents tetrakis(3,5-bis(trifluoromethyl)phenyl)borate.

Not all iridium catalyst candidates were active. The data in Table 1 indicate that the Ir(COD)$R^6$ moiety was beneficial to selectivity (where COD is a 1,5 cyclooctadiene ligand and $R^6$ is any ligand that can be activated off in less than the boiling point of the hydrogen terminated organosiloxane oligomer). The selectivity column refers to the hydrosilylation at site 1 (shown above). Without wishing to be bound by theory, it is thought that Ir(COD)$_2$BARF did not produce a detectable amount of product in the conditions tested in the example above because the activation temperature for COD is higher than the 70° C. boiling point of tetramethyldisiloxane (selected as the hydrogen terminated organosiloxane oligomer used in this example). Likewise, the activation temperature for acetyl acetonate (acac) is above 50° C., therefore, without wishing to be bound by theory it is thought that this is why the activity of Ir(I)CODacac is not detected at 50° C. but the activity of Ir(I)CODacac was detected at 70° C. Without wishing to be bound by theory, it is thought that the Ir(COD)indenyl is only partially active due to the higher activation temperature of the indenyl group. None of the iridium complex catalysts that did not contain a 1,5 cyclooctadiene ligand showed catalytic activity for the target reaction in this example. And, all of the iridium cyclooctadiene complex catalysts tested had better selectivity to the target product than Karstedt's catalyst in this example.

Example 3—Ir Cured Material

The following ingredients were combined in a flask: 40 g (0.298 mol) of TMDS and 19.2 g (0.152 mol) AMA. The over a 2 hour period. At that time, the conversion of AMA was determined by GC-MS and $^1$H NMR, with both indicating 0% AMA left over several trials. After heating, the contents of the flask were further processed. Excess TMDS was removed by vacuum at room temperature, followed distillation and adding 0.1 g BHT to stabilize the product. Yield of the target product in example 12 was 93% as measured by $^1$H NMR of the reaction product and the target product had 95% purity as measured by $^1$H NMR.

TABLE 2

Example 3 results

| Ratio (AMA:SiH) | 1:1 | 1:1.25 | 1:1.5 | 1:1.75 | 1:2 |
|---|---|---|---|---|---|
| Isolated Yield (of the target product based on amount of AMA consumed) | 12.3 g (31%) | 26.2 g (66%) | 32.7 g (82%) | 35.0 g (88%) | 35 g (88%) |
| SiH added | 21.5 g | 25 g | 30 g | 35 g | 42 g |
| XS SiH recovered | 0 g | 2 g | 5.3 g | 8 g | 15.7 g |

Example 4—Ir Cured Material

The following ingredients were combined in a flask: 12 g of 1,1,3,5,5-pentamethyltrisiloxane (PMTS) and 5 g AMA. The contents of the flask were heated at 55° C. under nitrogen and then 200 μL of a 0.025 M solution of [Ir(COD)Cl]$_2$ was added. The temperature was kept between 60°

C.-75° C. over a 90 min period. At that time, the conversion of AMA was determined by $^1$H NMR, indicating 10% AMA left. Yield of the target product in this example 4 was 90% as measured by $^1$H NMR of the reaction product.

Example 5—Karstedt's Catalyst (Comparative)

The following ingredients were combined in a flask: 1.8 g of PMTS, and 0.05 g BHT. The contents of the flask were heated at 55° C. under nitrogen and then 6 ppm of Karstedt's Catalyst was added followed by slow addition of 0.58 g AMA. The temperature was kept between 55° C.-65° C. over a 30 min period. At that time, the conversion of AMA was determined by $^1$H NMR. Yield of the target product (hydrosilylation of only 1 terminal SiH) in this example 5 was less than 5% as measured by $^1$H NMR of the reaction product, though polymerization occurred. At 15 minutes, resulted in the product of the method including the target product and many other side products due to hydrosilylation occurring at all sites.

All amounts, ratios, and percentages are by weight unless otherwise indicated by the context of the specification. The amounts of all ingredients in a composition total 100% by weight. The Brief Summary of the Invention and the Abstract are hereby incorporated by reference. The articles 'a', 'an', and 'the' each refer to one or more, unless otherwise indicated by the context of specification. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an aryl group, or an aralkyl group includes the member alkyl individually; the subgroup alkyl and aryl; and any other individual member and subgroup subsumed therein.

EMBODIMENTS OF THE INVENTION

In a first embodiment, a method for preparing a product comprises:
1) combining ingredients comprising
(A) an organohydrogensiloxane oligomer of formula (I)

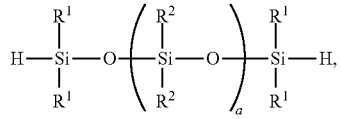

where each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; each $R^2$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; and subscript a is <20;

(B) a carboxylic acid alkenyl ester of formula (II)

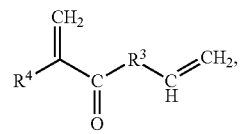

where $R^3$ is an alkylene group of 1 to 6 carbon atoms, and $R^4$ is hydrogen or an alkyl group of 1 to 6 carbon atoms; and
(C) an iridium complex of formula (III)

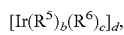

where subscript b is 1 or 2, $R^5$ is a 1,5-cyclooctadiene ligand or a 2,5-norbornadiene ligand, subscript c is 1 or 2, $R^6$ is a ligand that can be activated off the complex at a temperature less than the boiling point of the organohydrogensiloxane oligomer, and subscript d is 1 or 2;
where the product comprises a compound of formula (IV)

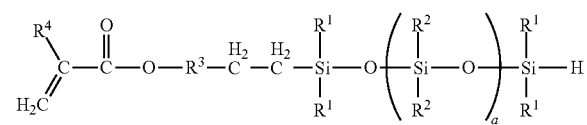

with at least 80 mole % selectivity based on all compounds formed by hydrosilylation of ingredients (A) and (B).

A second embodiment of the invention comprises the method of the first embodiment, where pressure in step 1) is 1 atmosphere or higher.

A third embodiment of the invention comprises the method of the second embodiment, where temperature in step 1) is 50° C. to 100° C.

A fourth embodiment of the invention comprises the method of the first embodiment, where each $R^1$ and each $R^2$ is a methyl group and subscript a is 0.

A fifth embodiment of the invention comprises the method of the fourth embodiment, where temperature in step 1) is 50° C. to 70° C.

A sixth embodiment of the invention comprises the method of any one of the first to fifth embodiments, where $R^3$ is methylene and $R^4$ is methyl.

A seventh embodiment of the invention comprises the method of any one of the first to fifth embodiments, where $R^5$ is 1,5 cyclooctadiene and $R^6$ is selected from the group consisting of a halogen atom, a beta-ketoester ligand, a halogenated beta-ketoester ligand, an alkoxy ligand, a cyanoalkyl ligand, an aryl ligand, and a heteroaryl ligand.

An eighth embodiment of the invention comprises the method of the seventh embodiment, where $R^6$ is selected from the group consisting of a beta-ketoester ligand, a halogenated beta-ketoester ligand, an alkoxy ligand, a cyanoalkyl ligand, an aryl ligand, and a heteroaryl ligand.

A ninth embodiment of the invention comprises the method of any one of the preceding embodiments, where the mixture further comprises (D) a solvent, (E) a stabilizer, or two or more of ingredients (D) and (E).

A tenth embodiment of the invention comprises the method of any one of the preceding embodiments, where the molar ratio of amounts of ingredient (A) to ingredient (B) [(A):(B) ratio] is 1:1 to 5:1.

An eleventh embodiment of the invention comprises the method of any one of the preceding embodiments, where the amount of ingredient (C) is 1 ppm to 100 ppm.

A twelfth embodiment of the invention comprises the method of any one of the preceding embodiments, where the selectivity is 89 mole % to 99 mole % based on combined weights of ingredients (A) and (B).

A thirteenth embodiment of the invention comprises a method for preparing an acrylate functional organosiloxane polymer comprising:

1) combining ingredients comprising (A) an organohydrogensiloxane oligomer of formula (I)

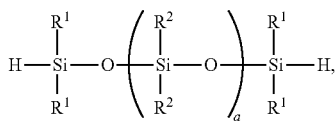

where each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; each $R^2$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; and subscript a is <20;

(B) a carboxylic acid allyl ester of formula (II)

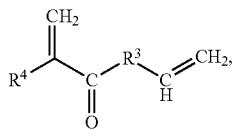

where $R^3$ is an alkylene group of 1 to 3 carbon atoms, and $R^4$ is hydrogen or an alkyl group of 1 to 6 carbon atoms; and (C) an iridium complex of formula (III)

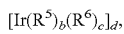

$[Ir(R^5)_b(R^6)_c]_d,$ where subscript b is 1 or 2, $R^5$ is a 1,5-cyclooctadiene ligand or a 2,5-norbornadiene ligand, subscript c is 1 or 2, $R^6$ is a ligand that can be activated off the complex at a temperature less than the boiling point of the organohydrogensiloxane oligomer, and subscript d is 1 or 2;

where the product comprises a compound of formula (IV)

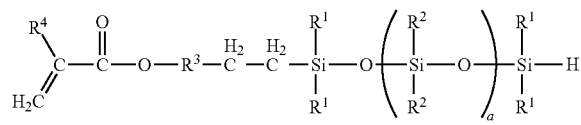

with at least 80 mole % selectivity;

2) combining (a) the compound of formula (IV) with (b) an aliphatically unsaturated organosiloxane polymer and optionally (c) a hydrosilylation catalyst other than the iridium cyclooctadiene complex of formula (III).

A fourteenth embodiment of the invention comprises the method of the thirteenth embodiment, where the aliphatically unsaturated organosiloxane polymer is a polydiorganosiloxane having aliphatically unsaturated terminal groups.

A fifteenth embodiment of the invention comprises a composition prepared by mixing ingredients comprising:

(A) an organohydrogensiloxane oligomer of formula (I)

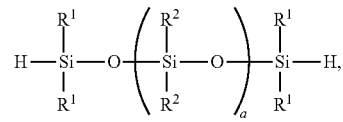

where each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; each $R^2$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; and subscript a is an integer up to 20;

(B) a carboxylic acid alkenyl ester of formula (II)

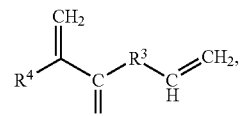

where $R^3$ is an alkylene group of 1 to 6 carbon atoms, and $R^4$ is hydrogen or an alkyl group of 1 to 6 carbon atoms; and (C) an iridium complex of formula (III)

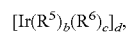

$[Ir(R^5)_b(R^6)_c]_d,$ where subscript b is 1 or 2, $R^5$ is a 1,5-cyclooctadiene ligand or a 2,5-norbornadiene ligand, subscript c is 1 or 2, $R^6$ is a ligand that can be activated off the complex at a temperature less than the boiling point of the organohydrogensiloxane oligomer, and subscript d is 1 or 2.

The invention claimed is:

1. An acrylate functional organosiloxane polymer of unit formula:

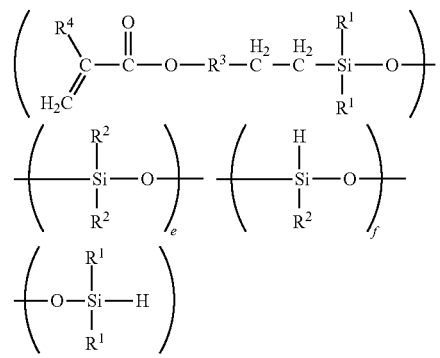

where each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms;

each $R^2$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms;
$R^3$ is an alkane-diyl group of 1 to 10 carbon atoms;
$R^4$ is hydrogen or an alkyl group of 1 to 6 carbon atoms;
subscript e is 0 to 10; and
subscript f is greater than 0 to 10.

2. The acrylate functional organosiloxane polymer of claim 1, where subscript e=0, subscript f=1, and the acrylate functional organosiloxane polymer has formula:

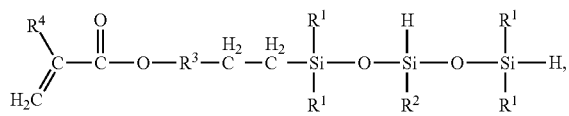

where each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; each $R^2$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; $R^3$ is an alkane-diyl group of 1 to 10 carbon atoms, and $R^4$ is hydrogen or an alkyl group of 1 to 6 carbon atoms.

3. The acrylate functional organosiloxane polymer of claim 2, where each $R^1$ is a methyl group, each $R^2$ is a methyl group, $R^3$ is methane-diyl, and $R^4$ is a methyl group.

4. A method for preparing a product comprising:
1) combining ingredients comprising
(A) an organohydrogensiloxane oligomer of unit formula (VI)

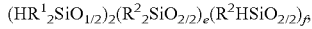

where subscript e is 0 to 20, subscript f is 0 to 20, each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; each $R^2$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms;
(B) a carboxylic acid alkenyl ester of formula (II)

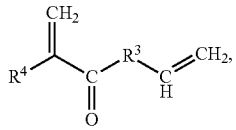

where $R^3$ is an alkane-diyl group of 1 to 10 carbon atoms, and $R^4$ is hydrogen or an alkyl group of 1 to 6 carbon atoms; and
(C) an iridium complex of formula (III)

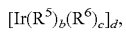

where subscript b is 1 or 2, $R^5$ is a 1,5-cyclooctadiene ligand or a 2,5-norbornadiene ligand, subscript c is 1 or 2, $R^6$ is a ligand that can be activated off the complex at a temperature less than the boiling point of the organohydrogensiloxane oligomer, and subscript d is 1 or 2;

where the product comprises a compound of unit formula (VII)

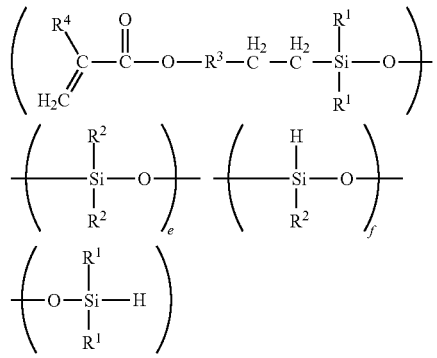

with at least 80 mole % selectivity based on all compounds formed by hydrosilylation of ingredients (A) and (B).

5. The method of claim 4, where each $R^1$ and each $R^2$ is a methyl group and subscript e is 0 or 1, and subscript f is 0 or 1.

6. The method of claim 4, where temperature in step 1) is 50° C. to 70° C.

7. The method of claim 4, where $R^3$ is methane-diyl, and $R^4$ is methyl.

8. The method of claim 4, where $R^5$ is 1,5 cyclooctadiene and $R^6$ is selected from the group consisting of a halogen atom, a beta-ketoester ligand, a halogenated beta-ketoester ligand, an alkoxy ligand, a cyanoalkyl ligand, an aryl ligand, and a heteroaryl ligand.

9. The method of claim 8, where $R^6$ is selected from the group consisting of a beta-ketoester ligand, a halogenated beta-ketoester ligand, an alkoxy ligand, a cyanoalkyl ligand, an aryl ligand, and a heteroaryl ligand.

10. The method of claim 4, where the ingredients in step 1) of the method form a mixture, and the mixture further comprises (D) a solvent, (E) a stabilizer, or two or more of ingredients (D) and (E).

11. The method of claim 4, where the molar ratio of amounts of ingredient (A) to ingredient (B) [(A):(B) ratio] is 1:1 to 5:1.

12. The method of claim 4 where the amount of ingredient (C) is 1 ppm to 100 ppm.

13. A method for preparing an acrylate functional organosiloxane polymer comprising:
1) combining ingredients comprising
(A) an organohydrogensiloxane oligomer of unit formula (V):

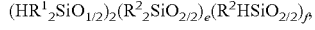

where subscript e is 0 to 20, subscript f is 0 to 20, each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; each $R^2$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms;
(B) a carboxylic acid allyl ester of formula (II)

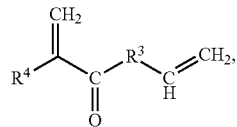

where $R^3$ is an alkylene group of 1 to 3 carbon atoms, and $R^4$ is hydrogen or an alkyl group of 1 to 6 carbon atoms; and (C) an iridium complex of formula (III)

$$[Ir(R^5)_b(R^6)_c]_d,$$

where subscript b is 1 or 2, $R^5$ is a 1,5-cyclooctadiene ligand or a 2,5-norbornadiene ligand, subscript c is 1 or 2, $R^6$ is a ligand that can be activated off the complex at a temperature less than the boiling point of the organohydrogensiloxane oligomer, and subscript d is 1 or 2;

where the product comprises a compound of unit formula (VII)

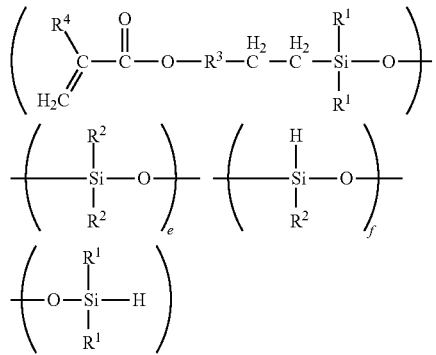

with at least 80 mole % selectivity;

2) combining (a) the compound of formula (VII) with (b) an aliphatically unsaturated organosiloxane polymer and optionally (c) a hydrosilylation catalyst other than the iridium cyclooctadiene complex of formula (III).

14. The method of claim 13, where the aliphatically unsaturated organosiloxane polymer is a polydiorganosiloxane having aliphatically unsaturated terminal groups.

15. A composition prepared by mixing ingredients comprising:

(A) an organohydrogensiloxane oligomer of unit formula (V):

$$(HR^1{}_2SiO_{1/2})_2(R^2{}_2SiO_{2/2})_e(R^2HSiO_{2/2})_f,$$

where subscript e is 0 to 20, subscript f is 0 to 20, each $R^1$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms; each $R^2$ is independently an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms;

(B) a carboxylic acid alkenyl ester of formula (II)

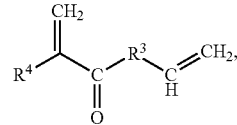

where $R^3$ is an alkylene group of 1 to 6 carbon atoms, and $R^4$ is hydrogen or an alkyl group of 1 to 6 carbon atoms; and (C) an iridium complex of formula (III)

$$[Ir(R^5)_b(R^6)_c]_d,$$

where subscript b is 1 or 2, $R^5$ is a 1,5-cyclooctadiene ligand or a 2,5-norbornadiene ligand, subscript c is 1 or 2, $R^6$ is a ligand that can be activated off the complex at a temperature less than the boiling point of the organohydrogensiloxane oligomer, and subscript d is 1 or 2.

* * * * *